United States Patent
Lee et al.

(10) Patent No.: US 11,122,455 B2
(45) Date of Patent: Sep. 14, 2021

(54) METHOD FOR POSITIONING TERMINAL IN WIRELESS COMMUNICATION SYSTEM AND APPARATUS THEREFOR

(71) Applicant: LG Electronics Inc., Seoul (KR)

(72) Inventors: Sangrim Lee, Seoul (KR); Myeongjin Kim, Seoul (KR); Hojae Lee, Seoul (KR); Minki Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 120 days.

(21) Appl. No.: 16/489,192

(22) PCT Filed: Feb. 26, 2018

(86) PCT No.: PCT/KR2018/002328
§ 371 (c)(1),
(2) Date: Aug. 27, 2019

(87) PCT Pub. No.: WO2018/159967
PCT Pub. Date: Sep. 7, 2018

(65) Prior Publication Data
US 2019/0380056 A1      Dec. 12, 2019

Related U.S. Application Data

(60) Provisional application No. 62/464,385, filed on Feb. 28, 2017, provisional application No. 62/470,831, filed on Mar. 13, 2017.

(51) Int. Cl.
*H04W 24/10*    (2009.01)
*H04J 4/00*     (2006.01)
*H04L 12/26*    (2006.01)

(52) U.S. Cl.
CPC ............... *H04W 24/10* (2013.01); *H04J 4/00* (2013.01); *H04L 43/0811* (2013.01);
(Continued)

(58) Field of Classification Search
CPC ...... H04B 7/0619; H04B 12/24; H04W 24/10
See application file for complete search history.

(56) References Cited

U.S. PATENT DOCUMENTS

2015/0023260 A1* 1/2015 Chiu ................ H04L 25/021
                                                       370/329
2016/0295366 A1  10/2016 Priyanto et al.
(Continued)

FOREIGN PATENT DOCUMENTS

WO       2016093662 A1    6/2016
WO       2016099079 A1    6/2016
WO    WO-2016099079 A1 *  6/2016  .......... H04B 7/0619

OTHER PUBLICATIONS

R1-1608966: 3GPP TSG RAN WG1 Meeting #86b, Lisbon, Portugal, Oct. 10-14, 2016, ZTE, ZTE Microelectronics, "Consideration on Sweeping Time Interval in NR," pp. 1-9.

*Primary Examiner* — Zhiren Qin
(74) *Attorney, Agent, or Firm* — Dentons US LLP

(57) ABSTRACT

A method for measuring and reporting, by a terminal, a positioning reference signal (PRS) in a wireless communication system according to one embodiment of the present invention comprises the steps of: measuring a plurality of positioning reference signals (PRSs) to which beamforming is applied; and reporting, to a base station, measurement results for at least two of the plurality of PRSs, wherein the plurality of PRSs are received via different transmission beams, and the terminal may report, to the base station, at least one from among transmission beam identification information indicating through which transmission beam each of the at least two PRSs has been received and resource identification information indicating through which resource each of the at least two PRSs has been received, together with the measurement results. The terminal is capable of communicating with at least one of another terminal, a (Continued)

terminal related to an autonomous driving vehicle, a base station or a network.

12 Claims, 16 Drawing Sheets

(52) U.S. Cl.
CPC ...... *H04L 43/0852* (2013.01); *H04L 43/0882* (2013.01); *H04L 43/0894* (2013.01)

(56) References Cited

U.S. PATENT DOCUMENTS

| | | |
|---|---|---|
| 2017/0026938 A1 | 1/2017 | Onggosanusi et al. |
| 2017/0079006 A1* | 3/2017 | Li ..................... H04W 72/0473 |
| 2017/0212206 A1* | 7/2017 | Kim ...................... H04W 8/005 |
| 2017/0374640 A1* | 12/2017 | Kim ...................... G01S 5/0226 |
| 2018/0180703 A1* | 6/2018 | Kim .......................... G01S 5/10 |
| 2018/0206063 A1* | 7/2018 | Frenger ................ G01S 5/0045 |
| 2019/0223038 A1* | 7/2019 | Yang .................. H04W 72/046 |

* cited by examiner

METHOD FOR POSITIONING TERMINAL IN WIRELESS COMMUNICATION SYSTEM AND APPARATUS THEREFOR

This application is a national stage entry of international application no. Pct/kr2018/002328 filed Feb. 26, 2018, which claims the benefit of U.S. provisional application Nos. 62/464,385 filed Feb. 28, 2017 and 62/470,831 filed Mar. 13, 2017, all of which are hereby incorporated by reference in their entirety for all purposes as if fully set forth herein.

TECHNICAL FIELD

The present disclosure relates to a wireless communication system, and more particularly, to a method of measuring and reporting a reference signal for determining the position of a terminal in a wireless communication system supporting beamforming and apparatus therefor.

BACKGROUND ART

As a number of communication devices have required much higher communication capacity, scenarios for the next generation communication system (e.g., 5G or new RAT) have been discussed in recent years. For example, Enhanced Mobile Broadband (eMBB), Ultra-reliable Machine-Type Communications (uMTC), and Massive Machine-Type Communications (mMTC) are included in the scenarios. The eMBB corresponds to a next generation mobile communication scenario characterized by high spectrum efficiency, high user experienced data rates, high peak data rates, etc. The uMTC corresponds to a next generation mobile communication scenario characterized by ultra-high reliability, ultra-low latency, ultra-high availability, etc. For example, the uMTC may include V2X, emergency services, remote control, etc. The mMTC corresponds to a next generation mobile communication scenario characterized by low cost, low energy, short packets, massive connectivity, etc. For example, the mMTC may include Internet of Things (IoT).

FIG. 1 illustrates relation between core performance requirements for 5G, which are proposed in IMT 2020, and 5G performance requirements for each service scenario. In particular, uMTC services have extremely restricted Over-The-Air (OTA) latency requirements and requires high mobility and reliability (e.g., OTA Latency <1 ms, Mobility >500 km/h, and BLER <10-6).

For the next generation wireless communication, new Radio Access Technology (RAT) considering the eMBB, mMTC, URLCC, etc. has been discussed.

DISCLOSURE

Technical Problem

The object of the present disclosure is to provide a method of determining the position of a terminal (user equipment) accurately and efficiently in a wireless communication system supporting beamforming and apparatus therefor.

The objects of the present disclosure are not limited by the above-mentioned object, and other objects can be clearly understood from the embodiments of the present disclosure.

Technical Solution

In an aspect of the present disclosure, provided herein is a method of measuring and reporting a positioning reference signal (PRS) by a user equipment (UE) in a wireless communication system. The method may include: measuring multiple PRSs to which beamforming is applied; and reporting measurement results of at least two PRSs among the multiple PRSs to a base station (BS). The multiple PRSs may be received in different transmission beams. The UE may report to the BS at least one of transmission beam identification information indicating in which transmission beam each of the at least two PRSs is received and resource identification information indicating on which resource each of the at least two PRSs is received, together with the measurement results.

In another aspect of the present disclosure, provided herein is a UE for measuring and reporting a PRS. The UE may include: a receiver; a transmitter; and a processor configured to control the receiver to measure multiple PRSs to which beamforming is applied and control the transmitter to report measurement results of at least two PRSs among the multiple PRSs to a BS. The multiple PRSs may be received in different transmission beams. The processor may be configured to report to the BS at least one of transmission beam identification information indicating in which transmission beam each of the at least two PRSs is received and resource identification information indicating on which resource each of the at least two PRSs is received, together with the measurement results.

The transmission beam identification information or the resource identification information for each of the at least two PRSs may be reported to the BS by being paired with a measurement result of a corresponding PRS.

The UE may receive the multiple PRSs through beam sweeping of multiple reception beams. The UE may report to the BS reception beam identification information in which reception beam each of the at least two PRSs is received, together with the measurement results.

The UE may transmit a PRS request to the BS. The UE's PRS request may include identification information on transmission beams preferred by the UE or information on resources preferred by the UE.

The UE may select K PRSs with high received power from among the multiple PRSs and reports the selected K PRSs.

Multiple transmission beams corresponding to the multiple PRSs may be formed on different resources.

Multiple beams corresponding to the multiple PRSs may be time division multiplexed (TDM) by independent beam sweeping, frequency division multiplexed (FDM) on a same time resource, or multiplexed using a hybrid of time division multiplexing (TDM) and frequency division multiplexing (FDM) based on beam-group sweeping.

The measurement results reported to the BS may include received power values of the at least two PRSs or a reception time difference between the at least two PRSs.

Advantageous Effects

According to the present disclosure, a UE can report a PRS measurement result and information for identifying a beam associated with a corresponding PRS to a BS, thereby estimating the position of the UE in the direction of a specific beam more accurately.

The effects obtainable from the present disclosure are not limited by the above mentioned effect, and other unmentioned effects can be clearly understood from the embodiments of the present disclosure.

DESCRIPTION OF DRAWINGS

The accompanying drawings, which are included to provide a further understanding of the present disclosure, and are incorporated in and constitute a part of this specification, illustrate embodiments of the invention and together with the description serve to explain the principles of the invention.

BEST MODE

The following description of embodiments of the present disclosure may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP based mobile communication system, by which the technical idea of the present disclosure may be non-limited. Specific terminologies used in the following description are provided to help understand the present disclosure and the use of the terminologies can be modified to a different form within a scope of the technical idea of the present disclosure.

Prior to discussion of the New RAT, the 3GPP LTE/LTE-A system will briefly be described. The following description of 3GPP LTE/LTE-A may be referenced to help understanding of New RAT, and some LTE/LTE-A operations and configurations that do not conflict with the design of New RAT may also be applied to New RAT. New RAT may be referred to as 5G mobile communication for convenience.

3GPP LTE/LTE-A System

Figure 1:
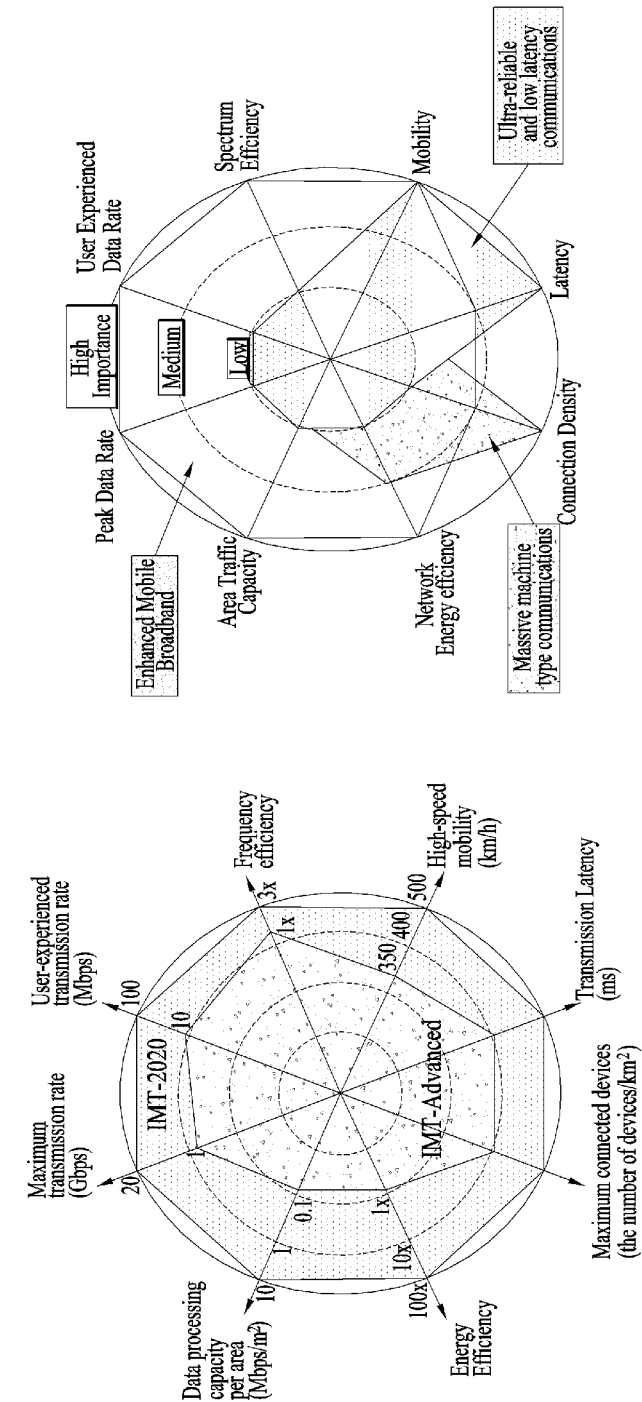
FIG. 1 illustrates a 5G service scenario and performance requirements thereof.
Figure 2:
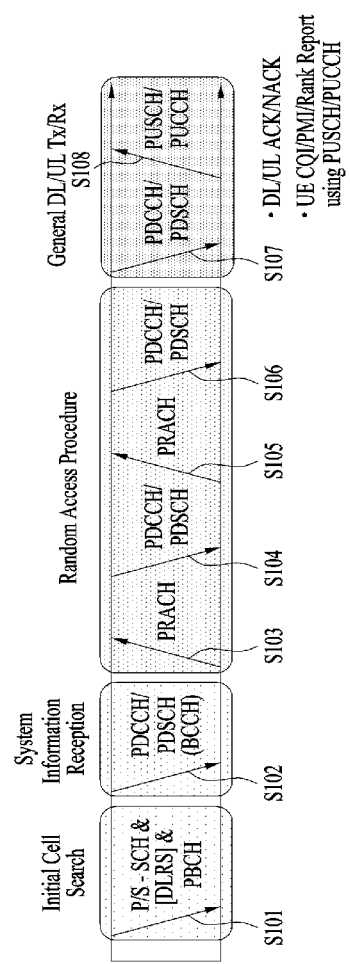
FIG. 2 illustrates physical channels used in the 3GPP LTE/LTE-A system and a general signal transmission method using the same.

FIG. 2 is a diagram for explaining an example of physical channels used for 3GPP LTE/LTE-A system and a general signal transmission method using the same.

Referring to FIG. 2, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the eNB, may match synchronization with the eNB and may then obtain information such as a cell ID and the like. Subsequently, the user equipment may receive a physical broadcast channel (PBCH) from the eNB and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Meanwhile, the user equipment may be able to perform a random access procedure to complete the access to the eNB [S103 to S106]. To this end, the user equipment may transmit a preamble via a physical random access channel (PRACH) [S103] and may be then able to receive a response message via PDCCH and a corresponding PDSCH in response to the preamble [S104]. In case of a contention based random access, it may be able to perform a contention resolution procedure such as a transmission [S105] of an additional physical random access channel and a channel reception [S106] of a physical downlink control channel and a corresponding physical downlink shared channel.

Having performed the above mentioned procedures, the user equipment may be able to perform a PDCCH/PDSCH reception [S107] and a PUSCH/PUCCH (physical uplink shared channel/physical uplink control channel) transmission [S108] as a general uplink/downlink signal transmission procedure. Control information transmitted to an eNB by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) and the like. In the present specification, the HARQ-ACK/NACK is simply called HARQ-ACK or ACK (NACK)

(A/N). The HARQ-ACK includes at least one of a positive ACK (simply, ACK), a negative ACK (NACK), DTX, and NACK/DTX. The UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Hereinafter, a contention-based random access procedure in the LTE system will be described in detail.

(1) Message 1 transmission: A User Equipment (UE) may randomly select one random access preamble from a random access preamble set indicated by system information or a handover command. Thereafter, the UE may select Physical Random Access Channel (PRACH) resources and then transmit the random access preamble using the selected PRACH resources.

(2) Message 2 reception: After transmitting the random access preamble, the UE attempts to receive a random access response within a random access response reception window indicated through the system information or the handover command by an eNB. More specifically, the random access response may be transmitted in the form of a Medium Access Control Protocol Data Unit (MAC PDU), and the MAC PDU may be delivered over a Physical Downlink Shared Channel (PDSCH). To receive information on the PDSCH successfully, the UE needs to monitor a Physical Downlink Control Channel (PDCCH). That is, a PDCCH preferably includes information on a UE to receive the PDSCH, information on time and frequency radio resources of the PDSCH, and information on a transmission format of the PDSCH. Once the UE succeeds in receiving the PDCCH destined therefor, the UE may successfully receive the random access response over the PDSCH according to information included in the PDCCH. The random access response may include an identifier (ID) of the random access preamble (e.g., a Random Access Preamble ID (RAPID)), an Uplink (UL) grant indicating UL radio resources, a temporary Cell-Radio Network Temporary Identifier (C-RNTI), and a Timing Advance Command (TAC).

(3) Message 3 transmission: Upon receiving a valid random access response, the UE processes information included in the random access response. That is, the UE applies the TAC and stores the temporary C-RNTI. In addition, the UE may store data to be transmitted in response to the received valid random access response in a message 3 buffer. Meanwhile, the UE transmits data (i.e. message 3) to the eNB using the received UL grant. Message 3 should include an ID of the UE. This is because in the contention-based random access procedure, the eNB cannot identify which UE performs the random access procedure but the eNB should identify the UEs to avoid a collision later.

(4) Message 4 reception: After transmitting the data including its ID based on the UL grant included in the random access response, the UE awaits reception of a command for contention resolution from the eNB. That is, the UE attempts to receive a PDCCH to receive a specific message. If the UE receives the PDCCH using its C-RNTI, the UE terminates the random access procedure after determining that the random access procedure has been performed normally.

Figure 3:
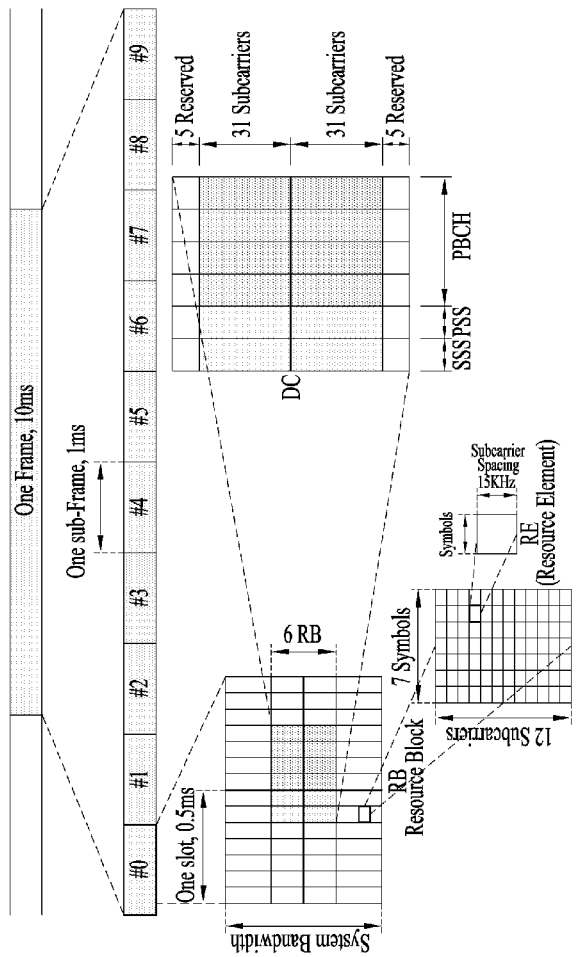
FIG. 3 illustrates the structure of a radio frame of the 3GPP LTE/LTE-A system.

FIG. 3 is a diagram for explaining an example of a structure of a radio frame. Referring to FIG. 3, UL/DL (uplink/downlink) data packet transmission is performed by a unit of subframe in a cellular OFDM radio packet communication system. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

A frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol period. The OFDM symbol may be named SC-FDMA symbol or symbol period. Resource block (RB) may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference. When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel). That is, when normal CP is used, 1 RB is defined as 12 subcarriers with 15 kHz subcarrier spacing and 7 OFDM symbols.

6 RBs at the center frequency are used to transmit a Primary Synchronization Signal (PSS) and a Secondary Synchronization Signal (SSS), which are used to establish synchronization, and a Physical Broadcast Channel (PBCH) for system information transmission. The above-described frame structure, signals, and channel locations may vary depending on a normal/extended CP, TDD/FDD, etc.

Figure 4:
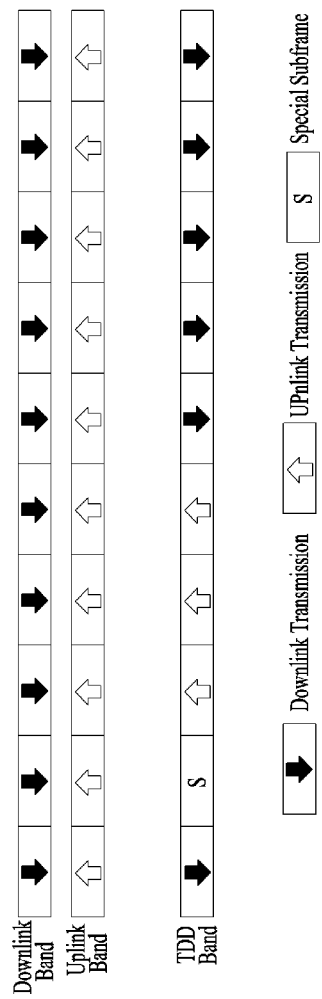
FIG. 4 illustrates Frequency Division Duplex (FDD) and Time Division Duplex (TDD) schemes of the 3GPP LTE/LTE-A system.

FIG. 4 illustrates FDD and TDD in the LTE/LTE-A system. Referring to FIG. 4, in the FDD, different frequency bands are used for DL and UL transmission, respectively. On the other hand, in the TDD, DL and UL regions are separated from each other on a subframe basis in the same frequency band.

Hereinafter, UL multiple access schemes of the LTE system will be described.

First, an SC-FDMA transmission scheme is explained. SC-FDMA may be referred to as Discrete Fourier Transform-spreading-Orthogonal Frequency Divisional Multiple Access (DFT-s-OFDMA). The SC-FDMA is an efficient transmission scheme capable of maintaining Peak-to-Average Power Ratio (PAPR) or a Cube Metric (CM) value at a low level and avoiding a non-linear distortion part of a power amplifier. The PAPR is a parameter representing waveform properties and obtained by dividing the peak value of waveform amplitude by a time-averaged root mean square (RMS) value. The CM is another measurement value representing the PAPR value. The PAPR is associated with a dynamic range which should be supported by a power amplifier at a transmitter. That is, to support transmission with a high PAPR value, the dynamic range (or a linear part) of the power amplifier needs to increase. Since the cost of the power amplifier increases as the dynamic range of the power amplifier increases, a transmission scheme capable of maintaining a low PAPR value is suitable for UL transmission. Accordingly, the current 3GPP LTE system has used the SC-FDMA capable of maintaining low PAPR as a UL transmission scheme.

Figure 5:
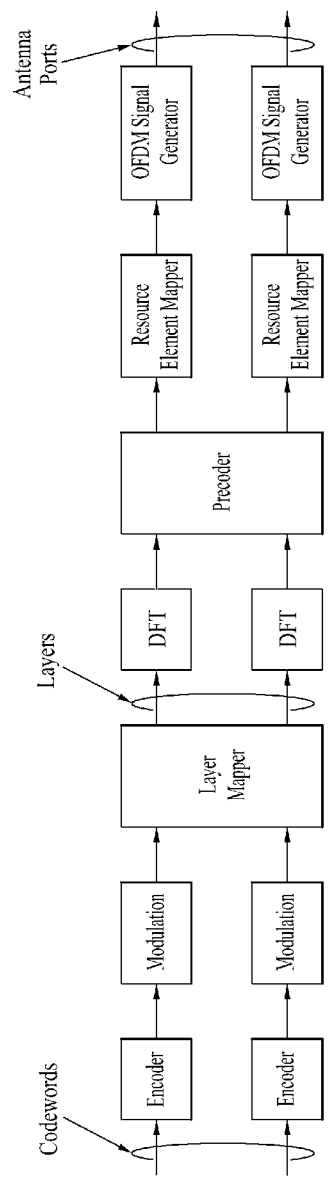
FIG. 5 illustrates an uplink data transmission procedure of the 3GPP LTE/LTE-A system.

FIG. 5 is a block diagram for explaining a DFT-s-OFDMA (or SC-FDMA) scheme for LTE uplink.

One or more codewords encoded by an encoder can be scrambled using a UE-specific scrambling signal. The scrambled codewords are modulated to complex symbols using a BPSK, QPSK, 16 QAM or 64 QAM scheme depending on the type of a transmitted signal and/or a channel state. Thereafter, the modulated complex symbols are mapped to one or more layers.

Although one codeword may be mapped to one layer on a symbol basis, one codeword can be distributedly mapped to up to four layers. If one codeword is distributedly mapped to a plurality of layers, symbols included in each codeword may be sequentially mapped to the layers and then transmitted. In a single-codeword transmission configuration, only one encoder and one modulation block are used.

In addition, transform precoding can be applied to layer-mapped signals. Specifically, Discrete Fourier Transform (DFT) based precoding may be applied to the layer-mapped signals. The layer-mapped signals are multiplied by a predetermined precoding matrix selected based on the channel state and then allocated to transmission antennas. Thereafter, the per-antenna transmitted signals are mapped to time-frequency resource elements to be used for transmission and then transmitted via the individual antennas after passing through an OFDM signal generator.

New RAT

To satisfy the low-latency requirement among new RAT performance requirements, a new subframe needs to be designed.

[Self-Contained Subframe]

Figure 6:
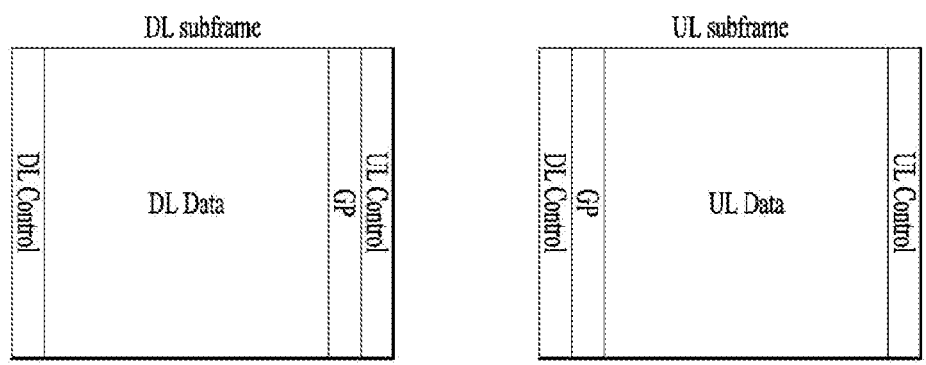
FIG. 6 illustrates the structure of a self-contained subframe according to an embodiment of the present disclosure.

FIG. 6 illustrates a self-contained subframe proposed for the new RAT system. In the following description, the self-contained subframe can be referred to as a subframe for simplicity.

According to a TDD-based self-contained subframe structure, both a resource region for DL and a resource region for UL (e.g., DL and UL control channels) exist in one subframe.

Although FIG. 6 shows the structure of the self-contained subframe where the subframe is composed in the following order: DL control region-data region-UL control region, the present disclosure is not limited thereto. For example, as another self-contained subframe structure, a subframe may be composed in the following order: DL control region-UL control region-data region.

The self-contained subframe can be classified as either a DL self-contained subframe or a UL self-contained subframe depending on the direction of data transmission in the corresponding subframe.

This self-contained subframe structure requires a time gap that allows an eNB and a UE to switch a transmission mode to a reception mode and vice versa. To this end, at least one OFDM symbol on which DL-to-UL switching is performed is set as a guard period (GP) in the self-contained subframe structure. The GP is located at the time when the DL-to-UL switching is performed. For example, in a DL subframe, the GP is located between a DL data region and a UL control region, and in a UL subframe, the GP is located between a DL control region and a UL data region.

Meanwhile, one subframe can be defined to have constant time duration. For example, in the New RAT (NR) system, the time duration of one subframe may be fixed to 1 ms. In this case, since the duration of one symbol is determined by subcarrier spacing, the number of symbols included in one subframe may also be determined by the subcarrier spacing. For example, if subcarrier spacing is 15 kHz, 14 symbols may be included in one subframe. However, if the subcarrier spacing doubles, that is, increases to 30 kHz, the duration of one symbol decreases by half. Thus, a total of 28 symbols may be included in one subframe. Generally, subcarrier spacing of 15 kHz*2 n can be used, and thus a total of 14*2 n symbols can be included in one subframe, where n is an integer such as 0, 1, 2, . . . , but n may not be necessarily a positive integer. For instance, if n is a negative integer, −1, a total of 7 symbols are included in one subframe.

[Analog Beamforming]

In a millimeter wave (mmW) system, since a wavelength is shortened, a plurality of antenna elements may be installed in the same area. For example, considering that the wavelength at 30 GHz band is 1 cm, a total of 100 antenna elements can be installed in a 5*5 cm panel at intervals of 0.5 lambda (wavelength) in the case of a 2-dimensional array. Therefore, it is expected that the mmW system will improve its coverage or throughput by increasing beamforming gain using multiple antenna elements.

In the mmW system, if each antenna element is equipped with a transceiver unit (TXRU), transmission power and phases can be adjusted per antenna element. Thus, independent beamforming may be performed for each frequency resource. However, installing TXRUs in all about 100 antenna elements is less feasible in terms of cost.

Therefore, a method of mapping a plurality of antenna elements to one TXRU and adjusting the direction of a beam using an analog phase shifter may be considered. However, such an analog beamforming method is disadvantageous in that frequency-selective beamforming is impossible because the same beam direction is formed over the full band.

To solve this problem, as a hybrid of digital beamforming and analog beamforming, hybrid beamforming where B TXRUs are mapped to Q antenna elements (where B<Q) may be considered. In the case of the hybrid beamforming, the number of beam directions that can be transmitted at the same time is limited to B or less, which depends on how B TXRUs and Q antenna elements are connected.

As described above, the hybrid beamforming where the digital beamforming and analog beamforming are combined using multiple antennas has been discussed in the NR system. The analog beamforming (or radio frequency (RF) beamforming) means an operation of performing precoding (or combining) at the RF stage. In the hybrid beamforming, precoding (or combining) is performed at each of the baseband stage and RF stage. Thus, the hybrid beamforming is advantageous in that it can guarantee performance similar to the digital beamforming while reducing the number of RF chains and the number of D/A (digital-to-analog) converters or A/D (analog-to-digital) converters.

For convenience of description, a hybrid beamforming structure may be represented by N TXRUs and M physical antennas. In this case, digital beamforming for L data layers to be transmitted by a transmission end may be represented by an N-by-L matrix. N digital signals, which are converted by the N-by-L matrix, are converted into analog signals by the TXRUs, and then analog beamforming, which is represented by an M-by-N matrix, is applied to the converted signals.

Figure 7:
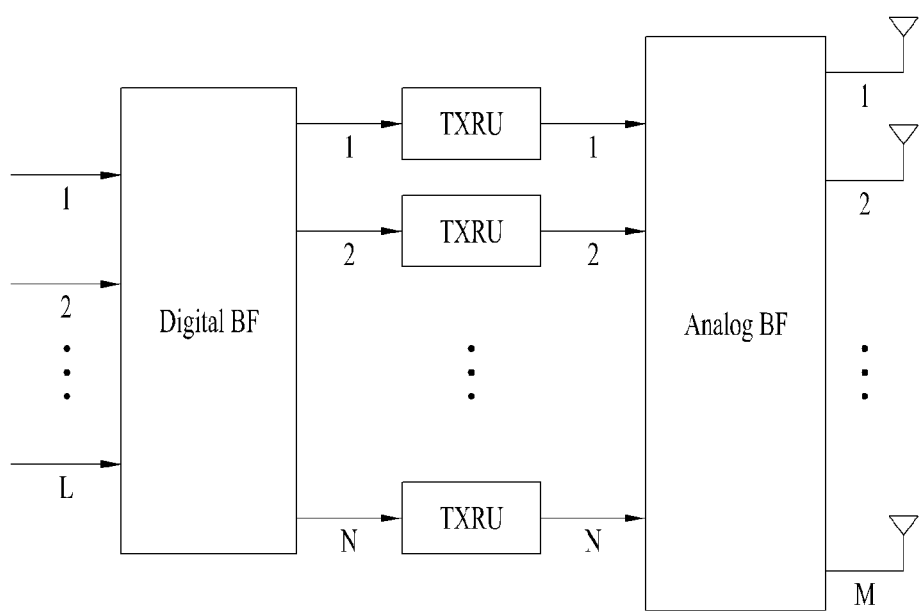
FIG. 7 illustrates a hybrid beamforming structure from the perspective of TXRUs and physical antennas.

FIG. 7 is a diagram schematically illustrating a hybrid beamforming structure from the perspective of TXRUs and physical antennas. In FIG. 7, the number of digital beams is L and the number of analog beams is N.

In the NR system, a method by which a base station (BS) modifies analog beamforming on a symbol basis to provide efficient beamforming to UEs located in a specific area has been considered.

Further, the NR system has considered a method of introducing a plurality of antenna panels capable of performing independent hybrid beamforming by defining N TXRUs and M RF antennas as one antenna panel as illustrated in FIG. 7.

When a BS uses a plurality of analog beams as described above, each UE has a different analog beam suitable for signal reception. Thus, the BS may change a plurality of analog beams to be applied to a specific subframe (SF) on a symbol basis by applying beam sweeping to synchronization signals, system information, paging, etc., whereby all UEs may have reception opportunities.

Figure 8:
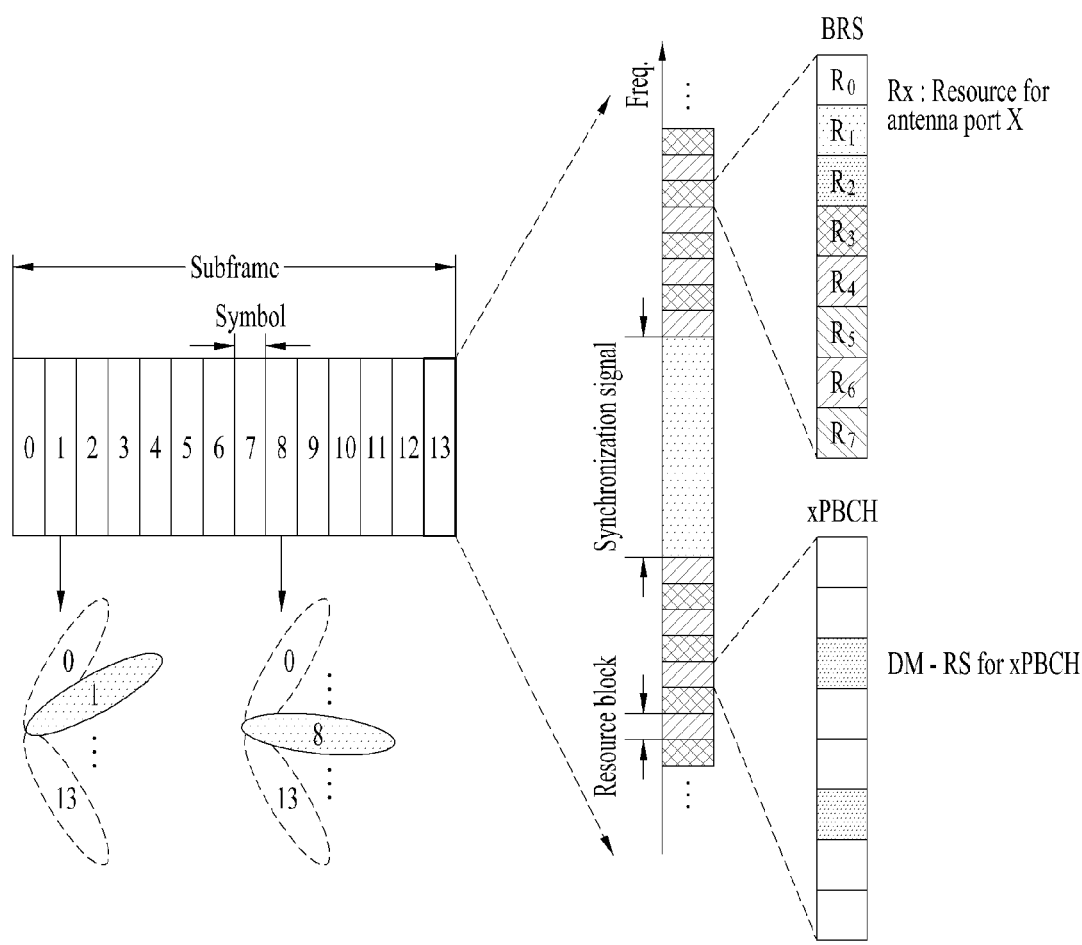
FIG. 8 illustrates beam sweeping for synchronization signals and system information in downlink transmission.

FIG. 8 illustrates beam sweeping for synchronization signals and system information in DL transmission. In FIG. 8, a physical resource (or channel) for transmitting system information of the NR system in a broadcasting manner is referred to as an xPBCH.

In FIG. 8, it is assumed that one subframe includes a total of 14 symbols. In addition, a different beam may be applied to each symbol. For example, beams 1 and 8 may be configured for symbols #1 and #8, respectively.

Analog beams belonging to different antenna panels may be simultaneously transmitted within one symbol. For example, analog beams 1 and 2 may be respectively transmitted on antenna panels 1 and 2 within one symbol. In addition, a beam reference signal (BRS), which is a reference signal (RS) transmitted in a single analog beam (corresponding to a specific antenna panel), may be introduced to measure a channel for each analog beam.

The BRS may be defined for each of a plurality of antenna ports, and each BRS antenna port may correspond to a single analog beam. FIG. 8 shows a total of 8 BRS antenna ports from R0 to R7. If a different analog beam is configured for each antenna port, BRSs may be transmitted in 8 analog beams in one symbol.

Meanwhile, since a synchronization signal or xPBCH needs to be received not only by a UE located in a specific direction but also by a UE at a random location in a cell, the synchronization signal or xPBCH may be transmitted in all analog beams of an analog beam group to assist unlike the BRS.

As described above, analog beamforming has been considered in the NR system. In particular, in the mmWave (mmW) system, since the analog beamforming is performed using a number of antennas, coverage can be extended.

In addition, a systems needs to be designed by considering the analog beamforming not only in mmW bands but also in bands below 6 GHz. In addition, either single beamforming or multiple beamforming may be applied depending on the capability of a BS. Herein, the single beamforming means that the analog beamforming is performed in one direction within one symbol, and the multiple beamforming means that the analog beamforming is performed in multiple directions within one symbol.

In the NR system, beam reciprocity, i.e., performing reception using the same beam as that used for transmission has been considered. This assumption may be particularly efficient in TDD bands.

A BS should be able to cover DL coverage using multiple beams. In particular, the NR system has many requirements for positioning (e.g., UE position estimation) than the conventional system.

Meanwhile, when many antennas are used for beamforming, a beam width may decrease. Considering such beamforming characteristics, accurate positioning may be achieved by the beamforming.

An RS for positioning is referred to as a positioning reference signal (PRS). Hereinafter, a method of transmitting and receiving a PRS using beamforming and a positioning method will be described with reference to embodiments.

[Downlink Positioning Reference Signal]

In the following, a description will be given of a DL PRS. First, the content of the DL PRS will be described in brief.

1. PRS Time/Frequency Setting:
   Mapping between resource and beam (e.g., time division multiplexing/frequency division multiplexing (TDM/FDM))
   Mapping between antenna port ID and beam
2. BS's Reporting Indication and UE's Reporting:
   Reporting of beam ID (or PRS resource ID) and received power
   Reporting of beam ID and time difference
   Reporting of PRS resource ID and time difference: (i) Wideband reporting; and (ii) Subband reporting
3. Beam Alignment Between BSs In the following embodiments, beam sweeping may be performed in the time and/or frequency domain.

The indices applied to the following proposals and embodiments are for convenience of description, and each of them do not have to be implemented as an independent invention. That is, embodiments/proposals with different indices may be implemented together unless they collide to each other.

Proposal #1: BS Configures Time/Frequency Resource for PRS Transmission (i) Example 1-1

A BS may manage N transmission (Tx) beams based on TDM. The BS may transmit a PRS N times in the beams respectively configured for N time resources.

The time resource per beam for the PRS transmission may be set to a multiple of a symbol/mini-slot/subframe.

The frequency resource for the PRS transmission may correspond to a wideband or a subband.

Figure 9:
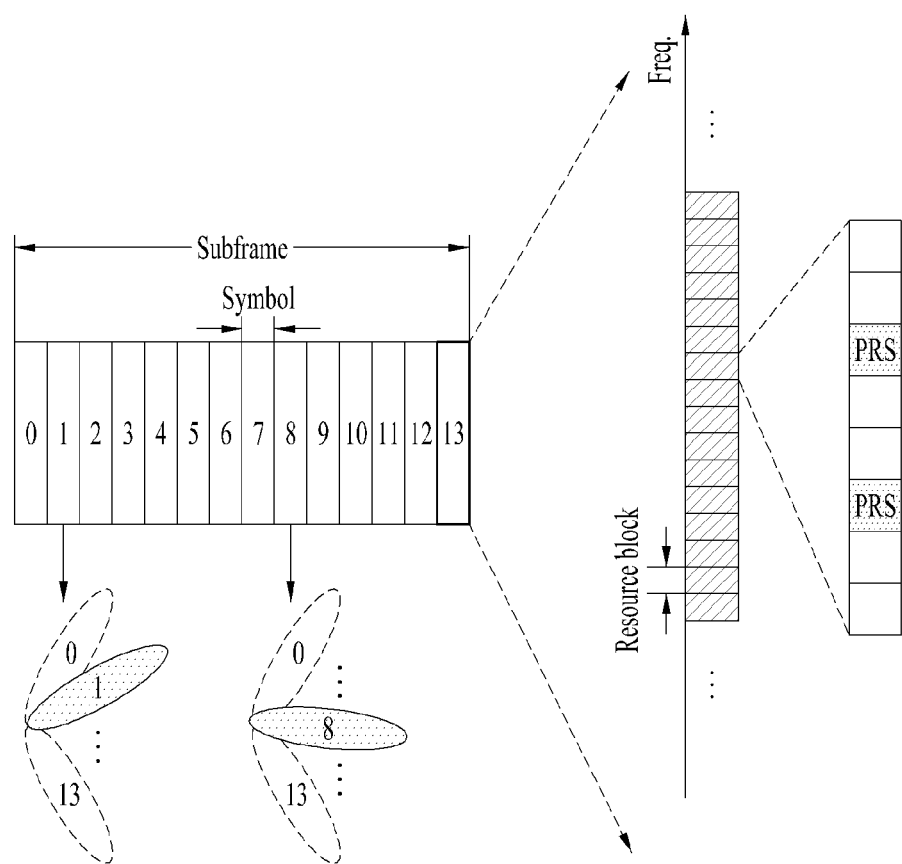
FIG. 9 illustrates that a total of 14 beams are swept on a symbol basis according to an embodiment of the present disclosure.

FIG. 9 illustrates that a total of 14 beams are swept on a symbol basis according to an embodiment of the present disclosure. In this case, a PRS is repeatedly transmitted in a beam corresponding to each symbol.

Figure 10:
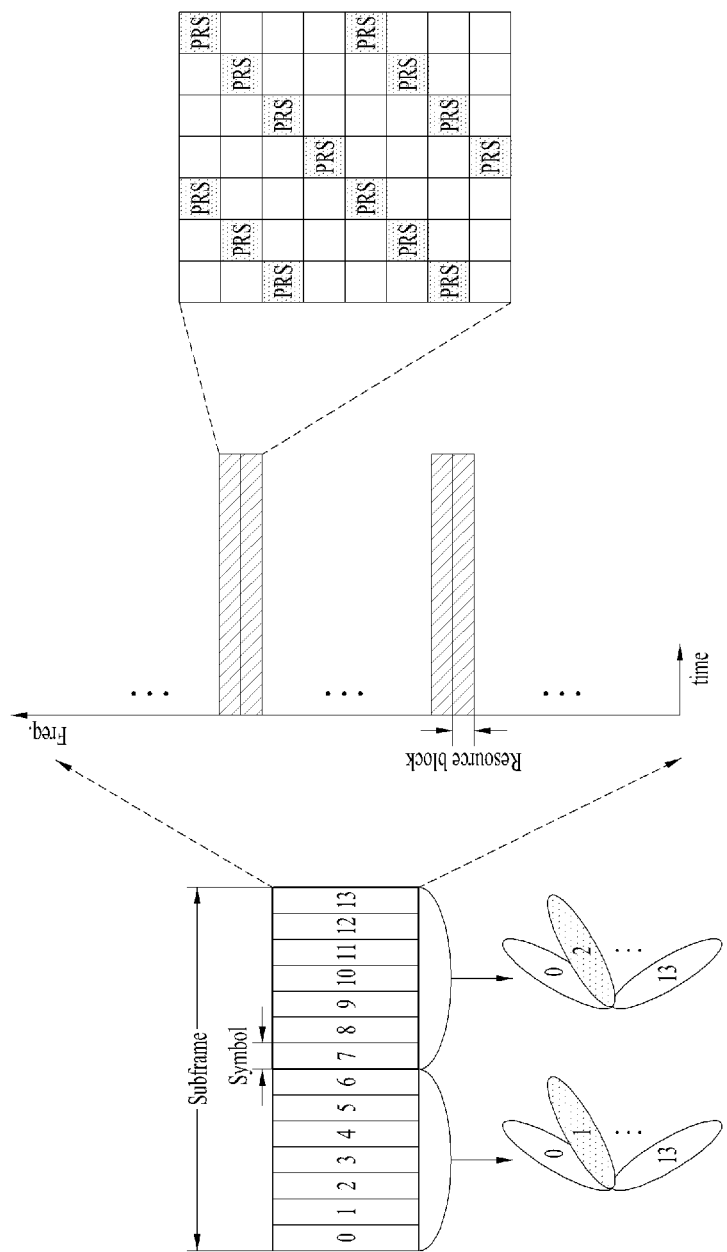
FIG. 10 illustrates a method of transmitting a PRS by performing beam sweeping on a 7-symbol basis according to an embodiment of the present disclosure.

FIG. 10 illustrates a method of transmitting a PRS by performing beam sweeping on a 7-symbol basis according to an embodiment of the present disclosure. Referring to FIG. 10, a PRS is transmitted in beam 1 during symbols 0 to 6, and a PRS is transmitted through beam 2 during symbols 7 to 13.

(ii) Example 1-2

A BS may mange N Tx beams based on FDM. The BS may transmit a PRS N times in the beams respectively configured for N frequency RBs.

The time resource per beam for the PRS transmission may be set to a multiple of a symbol/mini-slot/subframe.

Figure 11:
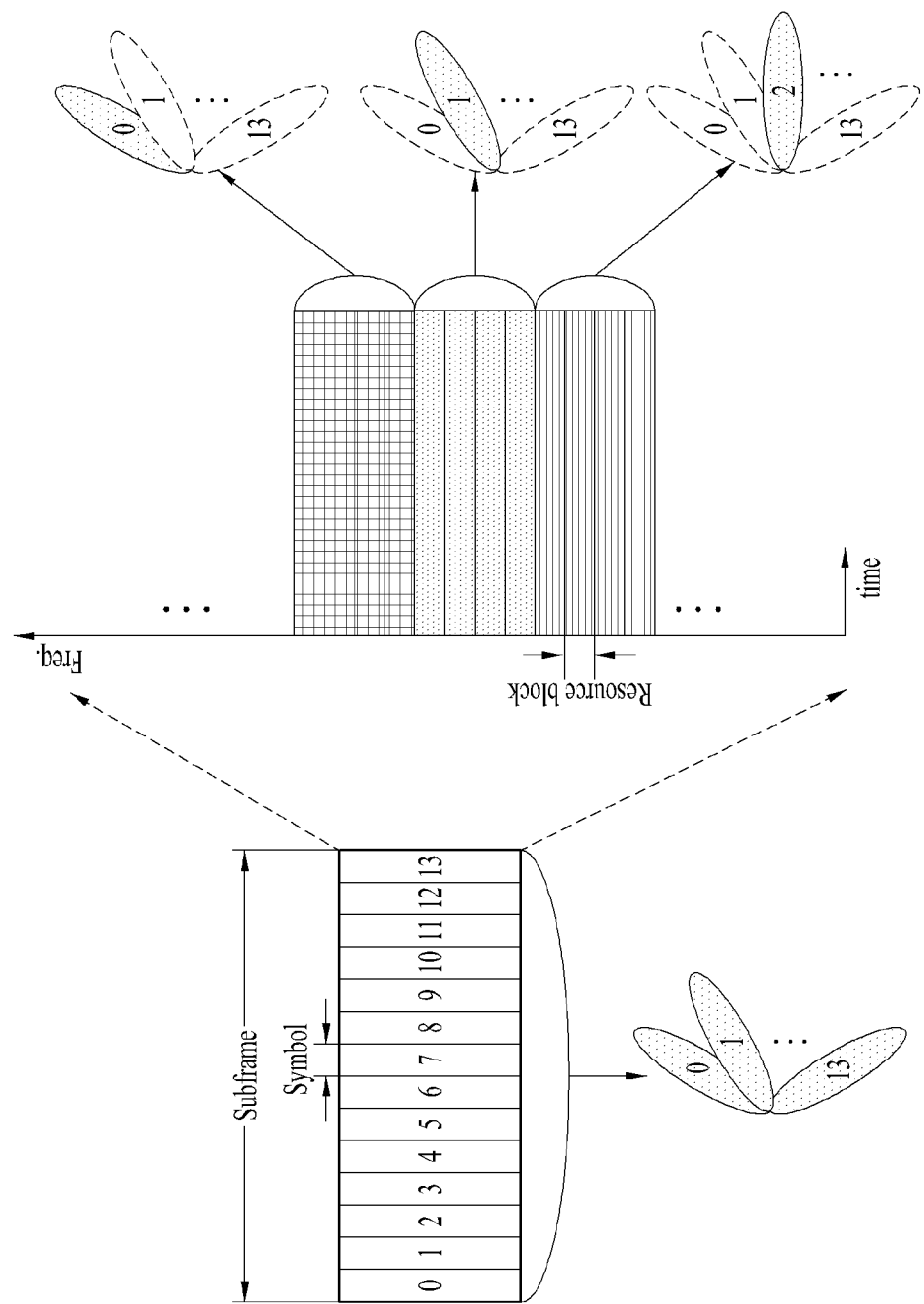
FIG. 11 illustrates that a PRS is transmitted using 14 beams based on FDM according to an embodiment of the present disclosure.

FIG. 11 illustrates that a PRS is transmitted using 14 beams based on FDM according to an embodiment of the present disclosure. In FIG. 11, 4 RBs are used for transmitting one beam.

(iii) Example 1-3

A BS may mange N Tx beams based on TDM/FDM. The BS may transmit a PRS N times in the N beams.

The time resource per beam for the PRS transmission may be set to a multiple of a symbol/mini-slot/subframe.

The frequency resource for the PRS transmission may correspond to a wideband or a subband.

Each beam may have a different time/frequency resource block.

Figure 12:
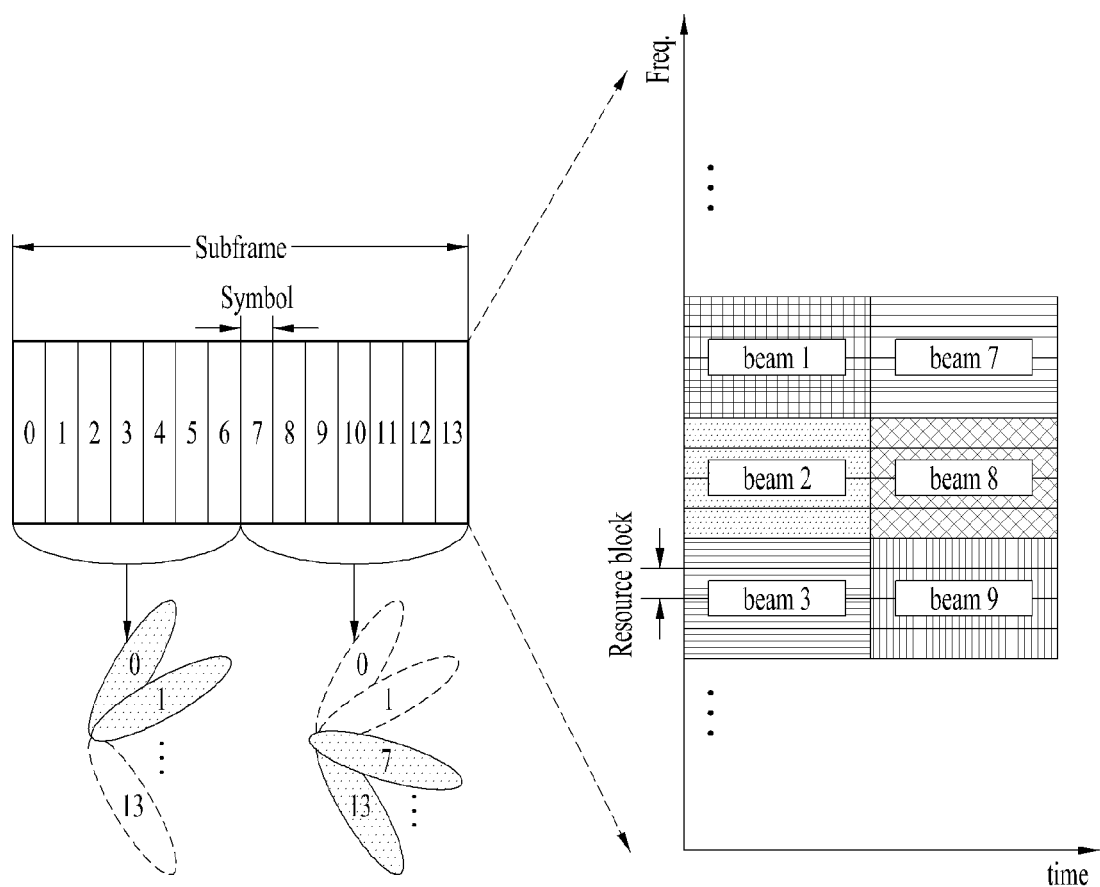
FIG. 12 illustrates a structure in which a PRS is transmitted in each beam using a combination of TDM and FDM according to an embodiment of the present disclosure.

FIG. 12 illustrates a structure in which a PRS is transmitted in each beam using a combination of TDM and FDM according to an embodiment of the present disclosure.

Referring to FIG. 12, beams 0 to 6 among 14 multiplexed beams are transmitted in symbols 0 to 6, and beams 0 to 7 thereamong are transmitted in symbols 0 to 13. In other words, the first 7 beams are frequency division multiplexed (FDM) over the first 7 symbols, and the remaining 7 beams are FDM over the next 7 symbols.

In Example 1-1, 1-2, or 1-3, the PRS transmission structure may be predefined or configured through higher layer signaling (e.g., RRC signaling). In addition, a UE may perform measurement and reporting based on a PRS received in each beam, and a BS may improve positioning accuracy by controlling Tx beamforming directions based on reports for individual beams.

In Example 1-1, 1-2, or 1-3, even if a BS manages N beams, the BS may use M beams for PRS transmission, where M may be equal to or less than N. In the case of M>N, the BS may increase the granularity of Tx Beamforming for positioning more than that of the N Tx beams for coverage. On the contrary, in the case of M<N, the BS may reduce resources used for the Tx beamforming for positioning, thereby reducing system overhead.

The periodicity with which a BS transmits a PRS may be informed by higher layer signaling. The PRS may not be transmitted periodically. That is, the PRS may be aperiodically transmitted. For example, when a specific event occurs (e.g., when a service such as URLLC, etc. is triggered), the BS may inform, through common signaling, that there is an aperiodic PRS symbol/slot/mini-slot/subframe and transmit a (aperiodic) PRS regardless of the PRS transmission periodicity. Upon receiving the common signaling, a UE may recognize that the aperiodic PRS is transmitted and then perform PRS measurement and reporting.

According to an embodiment of the present disclosure, a different port may be configured for each beam for PRS transmission unlike Example 1-1, 1-2, or 1-3 where beams are identified by resource mapping. For example, if a different antenna port is allocated for each beam and a PRS is transmitted in each beam, a UE may distinguish between different beams and PRSs transmitted therein using antenna ports.

Proposal #2: BS Indicates to UE Reporting Method and UE Performs Reporting According to Indication (i) Example 2-1

A BS may instruct a UE to report the received power of a PRS received in each beam (e.g., RSRP) or a distance (e.g., a distance between the BS and UE). The received power of the PRS may be used in estimating the distance between the BS and UE. For example, the BS may estimate the distance between the BS and UE by considering a difference between the transmitted power of the PRS and the received power of the PRS, path attenuation, etc. However, the present disclosure is not limited thereto.

The BS may instruct the UE to perform measurement and reporting for M beam(s), where M may be equal to or smaller than N, the number of beams managed by the BS.

To indicate the M beams that the UE should report, the BS may use beam IDs. However, instead of using the beam IDs, the BS may use resource information (e.g., a resource ID) for each beam to instruct the UE to measure and report the M beams. For example, although the BS may instruct the UE to report the PRS received power for beam IDs 1, 2, and 3, the BS may instruct the UE to measure and report the PRS received power for resource IDs 1, 2, and 3. Since the BS knows which beam is applied to each resource ID (e.g., a beam direction, a beam ID, etc.), the BS may obtain information on the PRS received power for each beam.

Thus, when reporting the PRS measurement results to the BS, the UE may also report PRS resource information (PRI) (e.g., PRS ID) and the PRS received power. For example, the UE may pair the PRS received power and the PRI together and then report the paired PRS received power and PRI. Specifically, the UE may report (RSRP 1, PRI 1) for PRS 1, (RSRP 2, PRI 2) for PRS 2, . . . , (RSRP N, PRI N) for PRS N. Although the RSRP is used as an example of a measurement value in this example, it is merely for convenience of description, the present disclosure is not limited thereto. Other measurement values (e.g., reception time, a received signal time difference (RSTD), etc.) may be paired with the PRI and then reported.

As another example, the UE may estimate the distance based on a difference between reference Tx power and the PRS received power and then report the estimated distance.

(ii) Example 2-2

A BS may instruct a UE to report K highest received power values (or a distance estimated therefrom) and beam IDs corresponding thereto.

Assuming that the BS uses N beams for PRS transmission, the UE may report to the BS information on beams carrying PRSs with the K highest received power values among N PRSs (e.g., beam IDs) and the K PRS received power values.

In this example, the beam ID may be replaced with PRI.

(iii) Example 2-3

A BS may instruct a UE to report a time difference (e.g., an RSTD) for each beam or PRS resource.

When the UE receives multiple PRSs in multiple beams, the UE may receive the multiple PRSs at different times. Thus, the UE may report a reception time difference between PRSs. To report the reception time difference between the PRSs, any one of the multiple PRSs may be determined as reference. For example, the UE may report the time difference to the BS using as the reference a reference beam or a reference PRS, which is predefined or configured by the network. The UE may report the time difference for each beam. Specifically, the UE may report the time difference by associating it with beam information (e.g., a beam ID) or PRI.

Although one BS may transmit multiple PRSs in multiple beams, different BSs may transmit multiple PRSs in multiple beams.

For example, the BS may instruct the UE to receive PRSs transmitted from different BSs and report the time difference for each beam or PRS resource. The UE may distinguish between the PRSs transmitted from the different BSs based on different time/frequency resource patterns. For instance, a time/frequency resource pattern may vary depending on a cell ID. The UE may identify the time/frequency resource pattern of each BS based on the cell ID or receive information on the time/frequency resource pattern of each BS from the network.

To distinguish between the PRSs transmitted from the different BSs, the UE may use a PRS time/frequency pattern that depend on a beam ID, instead of using the cell ID. The PRS time/frequency resource pattern may be determined based on the beam ID. In this case, the UE may not need to identify which BS a corresponding PRS is transmitted from. That is, the UE may distinguish between the PRSs using beam IDs.

Figure 13:
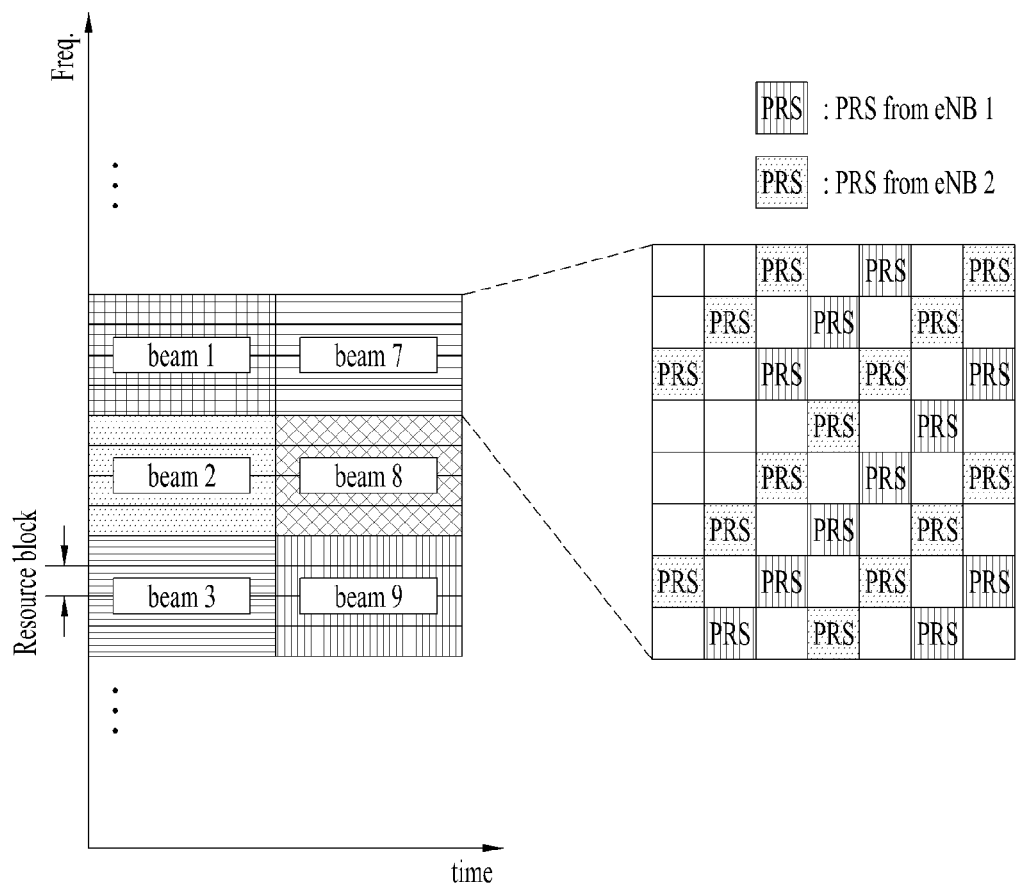
FIG. 13 illustrates that two BSs transmit PRSs according to an embodiment of the present disclosure.

FIG. 13 illustrates that two BSs transmit PRSs according to an embodiment of the present disclosure.

Referring to FIG. 13, BS 1 (eNB 1) and BS 2 (eNB 2) transmit PRSs on resources to which beam 7 is allocated. Among the resources to which beam 7 is allocated, PRS resources of BS 1 may be different from those of BS 2. That is, different BSs may not simultaneously transmit PRSs on the same PRS resources.

Each BS may have different PRS resources. In this case, a UE may calculate a reception time difference by compensating with a predetermined transmission time difference and then report the calculated reception time difference. Assuming that the PRS resources of BS 1 start from the first symbol and the PRS resources of BS 2 start from the second symbol, the UE may calculate an RSTD using a time interval between the first and second symbols.

Alternatively, the PRSs of the different BSs may be transmitted on the same resources. For example, the PRSs of the different BSs may be multiplexed by code division multiplexing (CDM). In this case, the UE may identify the PRS of each BS based on orthogonality between the PRSs.

In this example, multiple BSs may be replaced with multiple cells. The multiple cells may correspond to one or more BSs.

(iv) Example 2-4

A BS may inform a UE of a time difference measurement target using multiple pairs of {cell ID, beam ID}.

For example, the BS may instruct to the UE to report a time difference by measuring PRSs for four cells. Assuming that the BS indicates to the UE that {cell ID, beam ID}={1, 3}, {2, 4}, {3,2}, {4,3}, the UE may measure a PRS resource corresponding to cell ID 1 and beam ID 3, a PRS resource corresponding to cell ID 2 and beam ID 3, a PRS resource corresponding to cell ID 3 and beam ID 2, and a PRS resource corresponding to cell ID 4 and beam ID 3. Thereafter, the UE may report to the BS the PRS reception time difference for each cell identified by the cell ID.

In this example, the BS may indicate PRI instead of the beam ID. In addition, the BS may transmit to the UE information on PRS resource mapping of another cell through RRC signaling or higher layer signaling.

(v) Example 2-5

A BS may instruct a UE to report measurement results for K pairs of {cell ID, beam ID} with highest PRS received power.

For example, after measuring PRS received power for each beam ID of each cell, the UE may report measurement results for K pairs of {cell ID, beam ID} with good received signal quality.

In addition, the UE may select K beams for each cell with respect to received power and report reception time differences between PRSs for the K beams for each cell. For example, assuming that there are four cells and K is 3, the UE may report a total of 4 combination 2*9 time difference values.

In Examples 2-1 to 2-5, a BS may instruct a UE to perform reporting through physical layer signaling (e.g., a UE-specific or common signal) or higher layer signaling (e.g., RRC signaling).

In the above-described examples, a distance may be estimated based on a phase difference between multiple signals rather than a power difference.

Proposal #3: BS Transmits Positioning Information to Location Server Using Beam ID When a BS transmits positioning information to a location server, the BS may transmit not only a cell ID but a beam ID and beam information (e.g., a beam direction) corresponding to the beam ID. Alternatively, the BS may transmit only the beam direction except the beam ID to the location server.

Since the beam ID is an identifier that can be identified only by the BS, it may be difficult for the location server to identify a beam using only the beam ID. Thus, the BS may transmit to the location server information on the beam such as a beam direction, etc.

In addition, the BS may include its boresight information in the information transmitted to the location server.

Proposal #4: UE Reports Channel (i) Example 4-1

A UE may report a PRS measurement result on a PUCCH (e.g., a NR-PUCCH). For example, the UE may report to a BS PRI/beam ID and received power/time difference information over the PUCCH.

(ii) Example 4-2

A UE may report a PRS measurement result on a PUSCH. For example, when reporting the PRS measurement result on the data channel, the UE may include PRI/beam ID in the corresponding report.

When a BS attempts to transmit its logical information to a location server, the BS may covert the logical information into information that can be recognized by the location server. For example, if the BS dynamically uses the PRI, the BS may transmit to the location server information on a beamforming angle and a beam width, which correspond to the PRI.

Proposal #5: UE Measures and Reports Direction of Arrival (DOA) Through Reception (Rx) Beam Sweeping A UE may measure and report PRS received power for each Rx beam. For example, the UE may measure a PRS for each Rx beam by performing Rx beamforming in a time/frequency resource block allocated for Tx beam 1 shown in FIG. 12.

In addition to a Tx beam ID/PRI and a received power/time difference, the UE may report an Rx beam ID to a BS. For example, the UE may report a combination of {Tx beam ID, Rx beam ID, PRS received power}. In addition, the UE may report K Rx beams with highest received power among multiple beams obtained by performing the Rx beamforming. This configuration may be determined by the BS for the UE.

A UE may transmit an Rx beam ID, a direction corresponding thereto, and boresight information to a BS. Alternatively, the BS may request to the UE to transmit the corresponding information (for example, through higher layer signaling such as RRC signaling).

Proposal #6: UE Aperiodically Requests BS to Transmit PRS

A UE may aperiodically request a BS to transmit a PRS.

For example, the UE may need to perform a position update or improve resolution reliability for a high priority service which operates based on the position of the UE. To this end, the UE may request the BS to transmit the PRS.

The UE may request the BS to transmit the PRS through UE-dedicated beamforming or on a specific resource. For example, the UE may request the BS to transmit the PRS through Tx beamforming corresponding to beam ID=2. Alternatively, the UE may request the BS to transmit the PRS on a PRS resource corresponding to beam ID=2.

In this case, the beam ID requested by the UE for the PRS transmission may be equivalent to the ID of a Tx beam used by the UE to receive DL data or the ID of a Tx beam used by the UE to receive the most recent data. Alternatively, the beam ID requested by the UE for the PRS transmission may be equivalent to the ID of a Tx beam used for initial access.

The UE may send the request through physical layer signaling or higher layer signaling such as RRC signaling.

[Uplink Positioning Reference Signal]

The DL PRS has been described hereinabove. In the NR system, a UL PRS, which is transmitted by a UE, may be introduced.

In the NR system, the requirements of positioning resolution may be tightened. For example, to support an emergency medical service that requires high position accuracy, a positioning method triggered by a UE may be required. In addition, in the case of a sounding reference signal (SRS) used for obtaining CSI in LTE UL, it may be difficult to support massive UEs due to insufficient resources.

Therefore, the present disclosure proposes a new UL RS for NR positioning different from the conventional SRS.

Meanwhile, as the number of antennas of a BS increases, the BS may perform Rx beamforming. Similarly, as the number of antennas of a UE increases, the UE may perform Tx beamforming (e.g., analog/digital beamforming). Hence, the present disclosure describes a method of improving the accuracy of positioning through BS/UE's Rx/Tx beamforming.

Proposal #7: Framework for UL PRS Transmission at UE (i) Example 7-1: Periodic UL PRS Transmission A BS may configure a resource for periodic PRS transmission for a UE. A UL PRS configuration may include the periodicity and location of the time/frequency resource for a UL PRS. If two or more UL PRSs are code division multiplexed (CDM), the UL PRS configuration may include CDM code information, a cyclic shift value, etc. The UL PRS configuration may be transmitted through higher layer signaling such as RRC signaling.

The BS may activate/deactivate the periodic PRS transmission using a physical layer control channel or a higher layer signal.

(ii) Example 7-2: Aperiodic UL PRS Transmission

A BS may request a UE to perform aperiodic PRS transmission using a DL control channel. For example, downlink control information (DCI) for requesting the aperiodic PRS transmission may include the location of a UL PRS resource and code information for PRS multiplexing. In addition, the DCI may include precoding information (e.g., a precoding index) for the UE. Moreover, the DCI may indicate the number of times that the PRS transmission is repeated together with the resource. The configuration including the resource location for the aperiodic PRS transmission may be signaled through higher layer signaling, and the DCI may be used to request the UE to perform the aperiodic PRS transmission based on the predefined PRS configuration.

The UE may transmit an aperiodic PRS at the indicated location.

In Example 7-1/7-2, UL PRSs from different UEs may be multiplexed (e.g., FDM/TDM/CDM).

The UL PRS time/frequency resource may be located within a UL subframe. Alternatively, the UL PRS resource and a PRACH resource may be FDM within the same subframe. In this case, time resource information in a PRACH, which is transmitted in an MIB or SIB, may further include information on a frequency offset/allocation frequency size for FDM of the PRACH and UL PRS. By reading the PRACH information in the MIB or SIB, the UE may know the location of the PRS time resource (e.g., a subframe number, a PRS periodicity, etc.). In addition, the UE may also know the PRS resource from the frequency offset/allocation frequency information. In this example, beam sweeping may be simultaneously applied to the PRACH and UL PRS, thereby reducing the number of UL subframes that should be fixed for UL usage in TDD.

Proposal #8: Reciprocity Based UL PRS Transmission (UE-Triggering)

The NR system may support a UE-triggering event for a service that requires fast positioning or fine positioning resolution. In this case, a UE may improve positioning accuracy using BS/UE beamforming.

In an environment where beam reciprocity is valid, the UE may recognize a beam with high power among DL beams by measuring DL RSs (e.g., RSs for measurement). Based on the corresponding information, a BS and the UE may use beamforming for the positioning.

Figure 14:
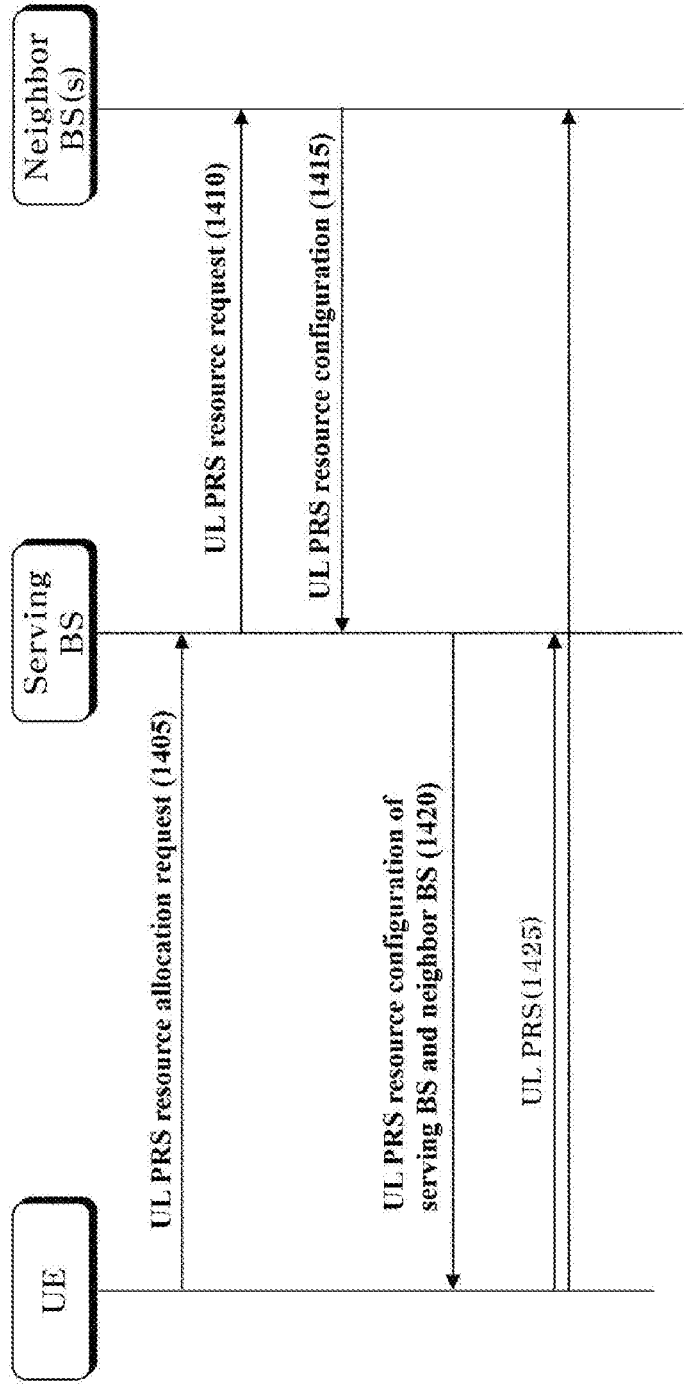
FIG. 14 illustrates a method of requesting aperiodic uplink (UL) PRS transmission and allocating a UL PRS resource based on UE triggering according to an embodiment of the present disclosure.

FIG. 14 illustrates a method of requesting aperiodic UL PRS transmission and allocating a UL PRS resource based on UE triggering according to an embodiment of the present disclosure.

Referring to FIG. 14, a UE requests a serving BS to allocate a UL PRS resource (1405). A signal for requesting the PRS resource may be transmitted on a control channel (e.g., PUCCH). The signal for requesting the PRS resource may be newly defined, or a conventional scheduling request (SR) signal may be reused to request the PRS resource. Alternatively, the PRS resource request may be transmitted through higher layer signaling such as RRC signaling. The UE may obtain cell IDs and beam IDs (or measurement resource IDs) of neighboring BSs by measuring DL RSs from the neighboring BSs and include the cell IDs and beam IDs in the PRS resource request.

The serving BS checks the cell IDs and beam IDs included in the PRS resource request and then request the corresponding BSs to transmit UL PRS resources (1410). In this case, the serving BS may forward the beam IDs to the neighboring BSs. For example, the serving BS may forward a beam ID preferred by the UE. By transmitting the beam IDs, Rx beamforming may be fixed.

The neighboring BSs may inform the serving BS of their UL PRS resource configurations (1415). The UL PRS resource configuration may include not only a time/frequency resource transmission time but also repetition where the RX beamforming is considered.

The serving BS informs the UE of its UL PRS resources and UL PRS resources of the neighboring BSs (1420). For example, the serving BS may inform the UE of the UL PRS time/frequency resources of the serving BS and the UL PRS time/frequency resources of the neighboring BSs. If the UL PRS time/frequency resources of the serving BS are different from those of the neighboring BSs, the serving BS may designate a specific precoding set for serving-cell interference control. For example, the serving BS may inform the UE of a precoding index set that can be used by the UE to transmit UL PRSs to the neighboring BSs. The corresponding information may be signaled through physical layer signaling or higher layer signaling such as RRC signaling.

The UE transmits a UL PRS to each BS on a UL PRS resource (1425). The UE may determine precoding for UL PRS transmission from among the precoding indices indicated by the serving BS according to DL beam correspondence.

Although the use of beamforming is assumed in this example, the present disclosure may be equally applied when there is no beamforming.

Figure 15:
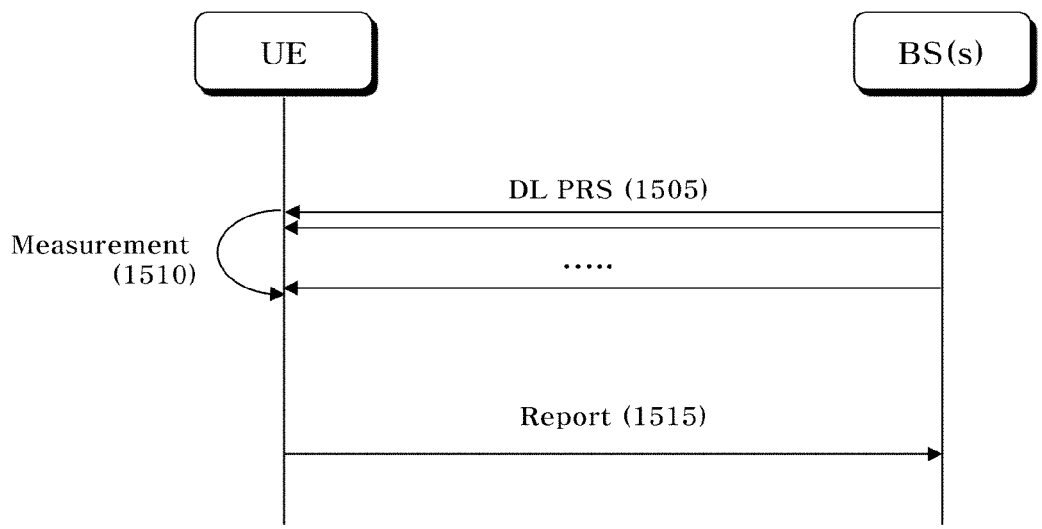
FIG. 15 illustrates a UE positioning method based on a DL PRS according to an embodiment of the present disclosure.

FIG. 15 illustrates a UE positioning method based on a DL PRS according to an embodiment of the present disclosure. Redundant description will be omitted.

Referring to FIG. 15, a network may transmit multiple DL PRSs (1505). The network may include at least one BS. For example, the multiple DL PRSs may be aperiodic DL PRSs transmitted in response to a UE's PRS request. The UE's PRS request may include identification information on Tx beams preferred by the UE or information on resources preferred by the UE. Alternatively, the multiple DL PRSs may be periodic DL PRSs.

Beamforming may be applied to multiple PRSs. For example, the multiple PRSs may be transmitted in different Tx beams.

Multiple Tx beams corresponding to the multiple PRSs may be formed on different resources.

Multiple beams corresponding to the multiple PRSs may be TDM by independent beam sweeping, FDM on the same time resource, or multiplexed using a hybrid of TDM and FDM based on beam-group sweeping.

The UE measures the multiple PRS to which the beamforming is applied (1510).

The UE reports the measurement results of at least two PRSs among the multiple PRSs to the BS (1515). The measurement results reported to the BS may include received power values of the at least two PRSs or a reception time difference(s) between the at least two PRSs.

For example, Tx beam identification information or resource identification information for each of the at least two PRSs may be reported to the BS by being paired with the measurement result of each PRS.

In addition, the UE may receive the multiple PRSs through beam sweeping of multiple Rx beams. The UE may report to the BS Rx beam identification information indicating in which Rx beam each of the at least two PRSs is received together with the measurement results.

Moreover, the UE may select K PRSs with high received power from among the multiple PRSs and then report the selected K PRSs.

Although it is described that PRI or a beam ID is explicitly reported, the present disclosure is not limited thereto. That is, beam information may be implicitly identified. For example, if a UL resource for transmitting a UE's report (e.g., time, frequency, OC code, cyclic shift, etc.) is determined based on the PRI or beam ID, a BS may recognize the PRI and beam ID based on which UL resource is used for receiving the UE's report. In this case, the PRI and beam ID may be omitted from the UE's report.

Figure 16:
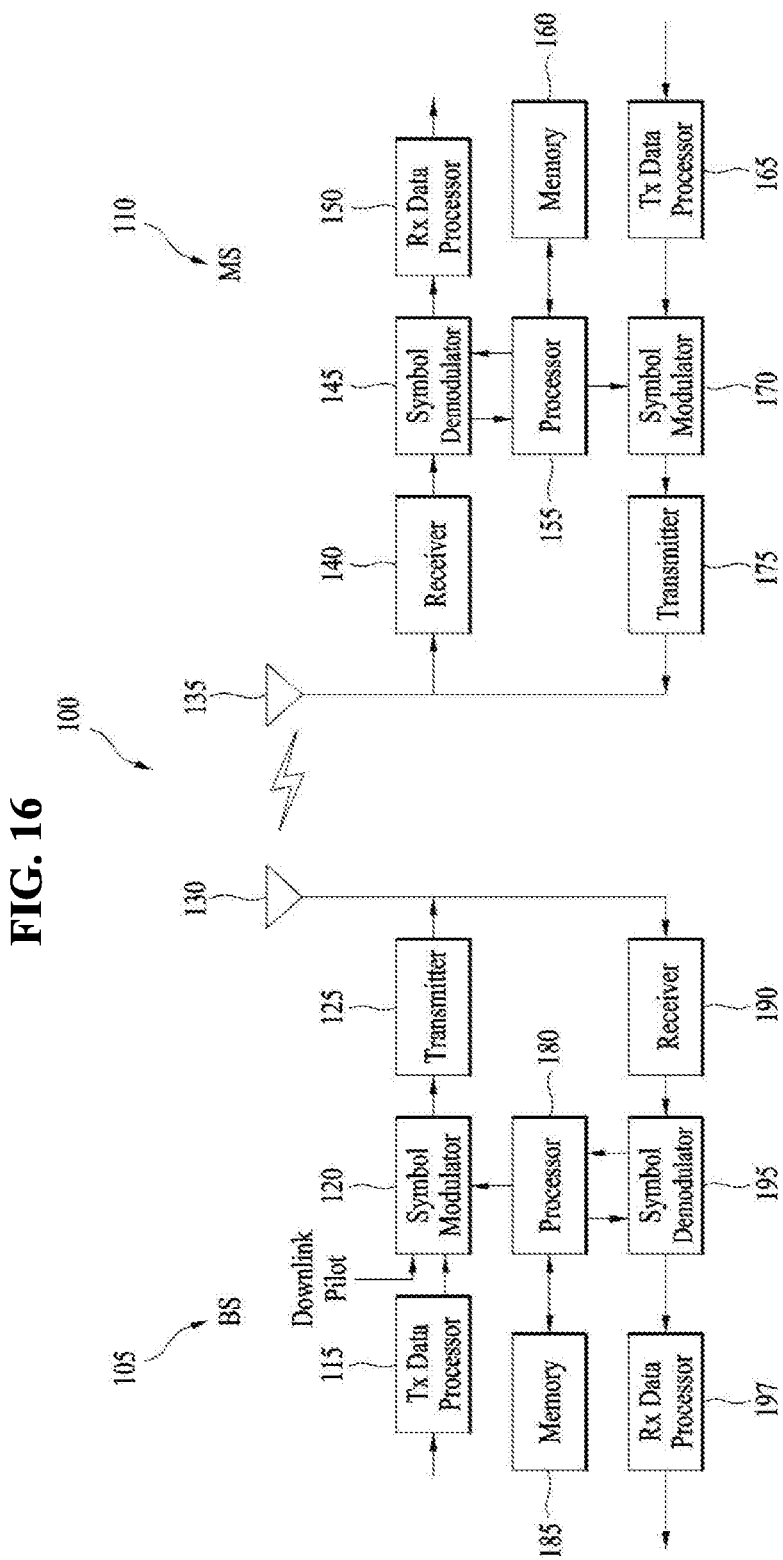
FIG. 16 illustrates a user equipment and a base station according to an embodiment of the present disclosure.

FIG. 16 is a block diagram for configurations of an eNB 105 and a user equipment 110 in a wireless communication system 100.

Although one eNB 105 and one user equipment 110 (D2D user equipment included) are shown in the drawing to schematically represent a wireless communication system 100, the wireless communication system 100 may include at least one eNB and/or at least one user equipment.

Referring to FIG. 16, an eNB 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the eNB/user equipment 105/110 includes one antenna 130/135 in the drawing, each of the eNB 105 and the user equipment 110 includes a plurality of antennas. Therefore, each of the eNB 105 and the user equipment 110 of the present disclosure supports an MIMO (multiple input multiple output) system. And, the eNB 105 according to the present disclosure may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the eNB and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the eNB 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the eNB 105 via the antenna 135.

In the eNB 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/eNB 110/105 directs operations (e.g., control, adjustment, management, etc.) of the user equipment/eNB 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/eNB and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and an eNB may be able to exchange RRC messages with each other through a wireless communication network and RRC layers.

The above-mentioned embodiments correspond to combinations of elements and features of the present disclosure in prescribed forms. And, it is able to consider that the respective elements or features are selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present disclosure has been described and illustrated herein with reference to the preferred embodiments thereof, it will be apparent to those skilled in the art that various modifications and variations can be made therein without departing from the spirit and scope of the invention. Thus, it is intended that the present disclosure covers the modifications and variations of this invention that come within the scope of the appended claims and their equivalents.

INDUSTRIAL APPLICABILITY

The present disclosure is applicable to various wireless communication systems.

The invention claimed is:

1. A method of measuring and reporting a positioning reference signal (PRS) by a user equipment (UE) in a wireless communication system, the method comprising:
   measuring multiple PRSs to which beamforming is applied based on transmitting a PRS request to a base station (BS); and
   reporting measurement results of at least two PRSs among the multiple PRSs to the the BS,
   wherein the multiple PRSs are received in different transmission beams, and
   wherein the PRS request includes identification information on transmission beams preferred by the UE or information on resources preferred by the UE, and
   wherein the UE reports to the BS identification information related to each of the measurement results.

2. The method of claim 1, wherein transmission beam identification information indicating in which transmission beam each of the at least two PRSs is received or resource identification information indicating in which resource each of the at least two PRSs is received is reported to the BS by being paired with a measurement result of a corresponding PRS.

3. The method of claim 1, wherein the UE receives the multiple PRSs through beam sweeping of multiple reception beams, and wherein the UE reports to the BS reception beam identification information indicating in which reception beam each of the at least two PRSs is received, together with the measurement results.

4. The method of claim 1, wherein the UE selects K PRSs with the highest reception power from among the multiple PRSs and further reports information related to the selected K PRSs.

5. The method of claim 1, wherein multiple transmission beams corresponding to the multiple PRSs are formed on different resources.

6. The method of claim 1, wherein multiple beams corresponding to the multiple PRSs are time division multiplexed (TDM) by independent beam sweeping, frequency division multiplexed (FDM) on a same time resource, or multiplexed using a hybrid of time division multiplexing (TDM) and frequency division multiplexing (FDM) based on beam-group sweeping.

7. The method of claim 1, wherein the measurement results reported to the BS include reception power values related to each of the at least two PRSs or one or more reception time difference value(s) between the at least two PRSs.

8. A user equipment (UE) for measuring and reporting a positioning reference signal (PRS), the UE comprising:
a receiver;
a transmitter; and
a processor configured to control the receiver, measure multiple PRSs to which beamforming is applied based on transmitting a PRS request to a base station (BS) and control the transmitter to report measurement results of at least two PRSs among the multiple PRSs to the BS,
wherein the multiple PRSs are received in different transmission beams, and
wherein the processor is further configured to report to the BS identification information related to the measurement results.

9. The UE of claim 8, wherein transmission beam identification information indicating in which transmission beam each of the at least two PRSs is received or resource identification information indicating in which resource each of the at least two PRSs is received is reported to the BS by being paired with a measurement result of a corresponding PRS.

10. The UE of claim 8, wherein the processor is further configured to receive the multiple PRSs through beam sweeping of multiple reception beams, and to report to the BS reception beam identification information indicating in which reception beam each of the at least two PRSs is received, together with the measurement results.

11. The UE of claim 8, wherein the processor is further configured to select K PRSs with the highest reception power from among the multiple PRSs and report information related to the selected K PRSs.

12. The UE of claim 8, wherein the UE is capable of communicating with at least one of another UE, a UE related to an autonomous driving vehicle, a base station or a network.

* * * * *